UNITED STATES PATENT OFFICE.

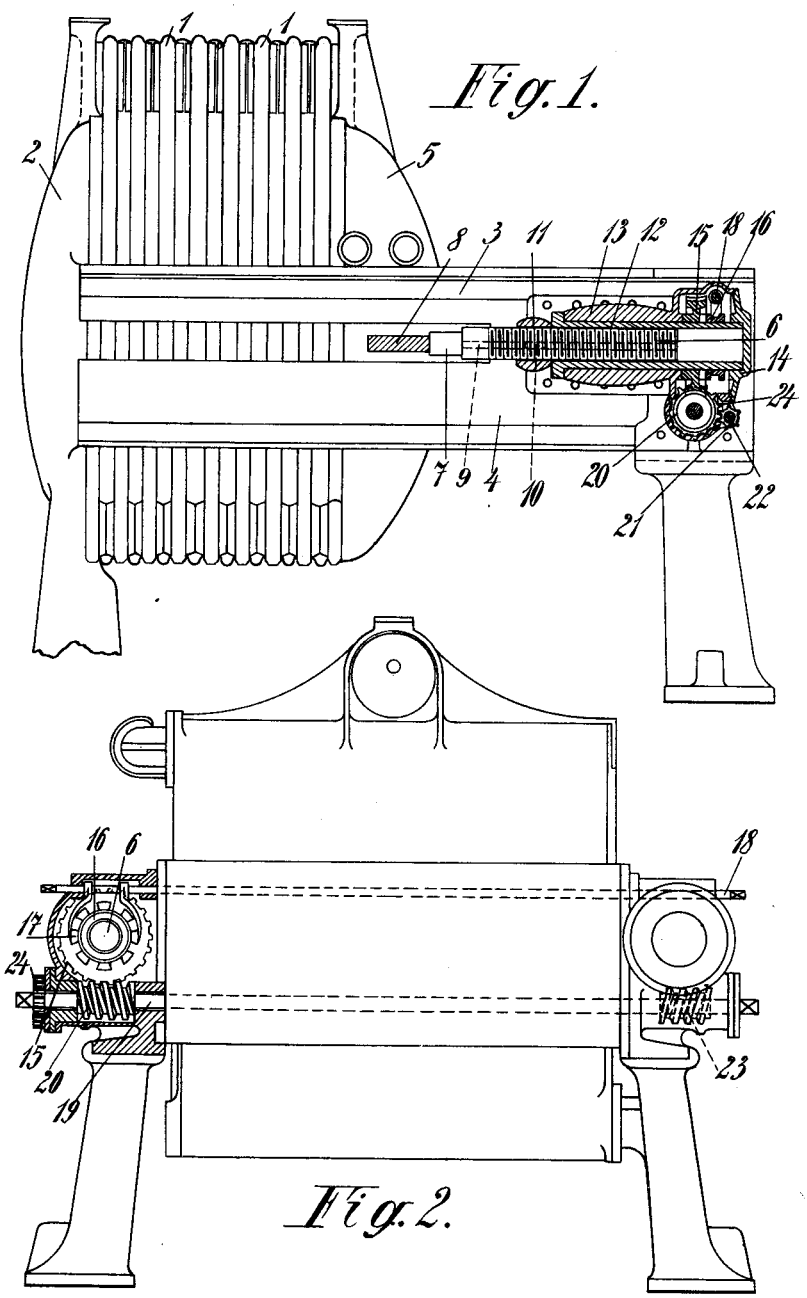

WILLIBALD SPIELVOGEL, OF MITTELNEULAND, GERMANY.

GEARING.

1,071,107.   Specification of Letters Patent.   Patented Aug. 26, 1913.

Application filed November 26, 1909. Serial No. 530,075.

*To all whom it may concern:*

Be it known that I, WILLIBALD SPIELVOGEL, director, a subject of the King of Prussia, residing at Mittelneuland, in the Province of Silesia, Kingdom of Prussia, Germany, have invented certain new and useful Improvements in Gearing; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to pressure exerting mechanism and while it is capable of general application it is particularly adapted to a filter press, such as is used in the brewing industry for the purpose of filtering the wort from the spent malt, although the filter press could also be used in other branches of fermenting or other industries where filtering is required. Such filter presses consist of a large number of chambers or frames of any desired cross section, such as for example round or rectangular, which are held together by pressure during the filtering process, between which frames filtering materials as for example filter cloths, are clamped. Up to the present these pressing devices generally consisted of worm gears, which were turnable in screw nuts and mounted at the end of the frame of the press, pressure being exerted on the movable head piece of the frames by turning the worm gears. On the other hand existed worm gears, which were mounted on both sides of the fixed head piece, and drawing-rods were arranged along the whole frame of the press, which pulled the movable head piece to the fixed one, when the worm gears piece were moved. Now according to the present invention the construction is considerably simplified by arranging the pressure device, that is generally speaking both the worm gears, at the end of the frame opposite the fixed head piece, thus completely dispensing with the use of long rods for producing the pressure.

I will now describe my invention with reference to the accompanying drawing in which:—

Figure 1 shows a side elevation of a press and a longitudinal vertical section of my improved pressure device thereto. In this case only a few filtering frames or plates are shown, a much greater number, however, can be used, so that the filter press can be much longer. Fig. 2 is an end elevation seen from the head end of the filter showing a vertical transverse section of one of the worm gears.

2 designates the stationary head of the filter press rigidly connected with the guides 3, 4 of the frame.

5 designates the movable head displaceable on the guide 3.

The plates or frames 1, with the filter cloths arranged between them, are firmly pressed together in the known manner when filtering, between both the heads 2 and 5, but when cleaning the filter press the heads 2 and 5 are drawn apart from each other on the guide 3 of the frame.

The feeding of the material to be filtered, for example the mash, and the removal of the filtered wort is effected in known manner.

The construction and method of working of the pressure device is as follows:—A non-rotatable spindle 6 provided with screw thread is arranged on each side of the frame. This spindle has a prolongation 7 which can exert a pressure action on the part 8 inserted in the movable head 5. The spindle 6 is prevented from rotating by a key 10 arranged in the bearing 11, which key engages a longitudinal slot 9 in the spindle. The spindle is surrounded by a sleeve-like nut 12 which is arranged in the bearing 13 and is supported at one end on the bearing 11 and on the other end in the fixed cover plate 14, so that said sleeve can turn, but cannot be moved in a longitudinal direction. On the sleeve 12 is mounted a worm wheel 15 and a corresponding coupling 16 with clutches 17 said coupling 16 not rotating on the sleeve, but movable in a longitudinal direction. The coupling on both sides can be connected simultaneously by means of a shaft 18. In Fig. 1 the couplings are shown connected up. With the worm wheels 15 there engage two worms 20, 23 fitted to the same shaft 19, which, in order to counteract any axial thrust, are right and left threaded respectively. The ends of the shafts 18 and 19 are provided with square heads for attaching cranks. A cog wheel 24 is fitted to one or both ends of the shaft 19, and meshes with a small cog wheel 21 of a shaft 22 situated beside it. The shaft 22 is also provided with a square head for the crank.

The operation of the mechanism is as follows:—The shaft 19 is rotated by means of a crank (not shown) placed on the square end of said shaft which carries the worms 20 and 23, and these cause the worm-wheels 15 to rotate so that when the latter are connected to the sleeve 12, through the medium of the couplings 16 and clutches 17, said sleeves are caused to rotate. As the threads of the sleeves 12 engage the threads of the spindles 6 and the sleeves are held against longitudinal or axial movement in the bearings 11 and 14 and the spindles are prevented from rotating by the keys 10 engaging the longitudinal slots 9, the rotation of the sleeves impart longitudinal movement of the spindles 6 and the movable head 5 is moved toward the stationary head 2. If the crank be placed on the shaft 22 the rotary movement thereof is transmitted to shaft 20 through the medium of the cog-wheels 21 and 24 on the shafts 22 and 20 respectively. The wheel 21 being much smaller than the wheel 24 the power is greatly increased.

The movable head 5 and the plates 1 must be moved from the head 2 by hand unless the prolongation 7 is rigidly connected to the part 8 of the head 5 which could be effected without in any way changing the construction of the parts as the spindle 6 is, as above described, not rotatable.

The coupling 16, 18 is for the purpose of permitting a correct adjustment of the spindles beforehand. If for example the coupling 16, 18 is disengaged, then the sleeves 12 can be rotated independently of the worm wheels 15, the flange of the sleeve being so formed, that it can be turned by a wrench. One spindle 6 is threaded to the right and the other to the left.

I claim—

1. In a filter press, a press frame and its movable element, longitudinally movable non-rotatable screw spindles mounted on said frame adjacent to the movable element thereof and arranged to engage lateral extensions connected with said element, rotatable sleeves journaled on said frame for advancing and retracting the spindles and gearing for rotating said sleeves simultaneously.

2. In a filter press, the combination of two parallel screw-threaded spindles, fixed bearings for the spindles, keys in the bearings projecting into longitudinal slots in the spindles, sleeves on the spindles journaled on said bearings and having internal screw-threads engaging the threads of the spindles, worm-wheels on the sleeves, clutches slidable on and keyed to the sleeves adapted to couple the worm-wheels to the sleeves, and a transverse rotatable shaft having right and left threaded worms thereon engaging the worm wheels.

In testimony that I claim the foregoing as my invention, I have signed my name in presence of two subscribing witnesses.

WILLIBALD SPIELVOGEL.

Witnesses:
 WOLDEMAR HAUPT,
 HENRY HASPER.

Copies of this patent may be obtained for five cents each, by addressing the "Commissioner of Patents, Washington, D. C."